US011102294B2

(12) United States Patent
Rogers et al.

(10) Patent No.: US 11,102,294 B2
(45) Date of Patent: Aug. 24, 2021

(54) SYSTEM AND METHOD FOR SUPPORTING ENERGY AND TIME EFFICIENT CONTENT DISTRIBUTION AND DELIVERY

(71) Applicant: Samsung Electronics Co., Ltd., Suwon-si (KR)

(72) Inventors: Harry Rogers, San Jose, CA (US); Sompong Paul Olarig, Pleasanton, CA (US); Ramdas P. Kachare, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 15/678,051

(22) Filed: Aug. 15, 2017

(65) Prior Publication Data
US 2018/0359318 A1    Dec. 13, 2018

Related U.S. Application Data

(60) Provisional application No. 62/517,821, filed on Jun. 9, 2017.

(51) Int. Cl.
| G06F 16/13 | (2019.01) |
| G06F 16/27 | (2019.01) |
| H04L 29/08 | (2006.01) |
| H04L 29/12 | (2006.01) |
| G06T 1/20 | (2006.01) |
| G06F 12/02 | (2006.01) |

(52) U.S. Cl.
CPC ...... *H04L 67/1097* (2013.01); *G06F 12/0246* (2013.01); *G06T 1/20* (2013.01); *H04L 61/2596* (2013.01); *G06F 2212/7201* (2013.01)

(58) Field of Classification Search
None
See application file for complete search history.

(56) References Cited

U.S. PATENT DOCUMENTS

| 8,489,760 B2 | 7/2013 | Visharam et al. |
| 8,745,262 B2 | 6/2014 | Kohli et al. |
| 8,996,781 B2 | 3/2015 | Schuette et al. |
| (Continued) | | |

FOREIGN PATENT DOCUMENTS

CN    204242036 U    4/2015

OTHER PUBLICATIONS

Klimov, Dmitri et al., "GPU Accelerated H.264 Video Compression for Broadcast", SMPTE Meeting Presentation, 2010 SMPTE Annual Technical Conference & Expo, (16 Pages).

(Continued)

*Primary Examiner* — Nasser M Goodarzi
*Assistant Examiner* — Terrika Peterson
(74) *Attorney, Agent, or Firm* — Lewis Roca Rothgerber Christie LLP

(57) ABSTRACT

A method of transferring data to an end user via a content distribution network using an nonvolatile memory express over fabrics (NVMe-oF) device, the method including receiving a read request at the NVMe-oF device, translating a logical address corresponding to the data to a physical address, fetching the data from a flash storage of the NVMe-oF device, processing the data with a GPU that is either embedded in the NVMe-oF device, or on a same chassis as the NVMe-oF device, and transferring the data.

8 Claims, 5 Drawing Sheets

(56) References Cited

U.S. PATENT DOCUMENTS

| | | | |
|---|---|---|---|
| 9,021,189 B2 | 4/2015 | Salessi | |
| 9,092,321 B2 | 7/2015 | Salessi | |
| 9,176,883 B2 | 11/2015 | Yang | |
| 9,430,412 B2 | 8/2016 | Huang | |
| 2004/0210582 A1* | 10/2004 | Chatterjee | G06F 16/27 |
| 2010/0070515 A1* | 3/2010 | Dutton | G06F 16/13 |
| | | | 707/755 |
| 2014/0195725 A1* | 7/2014 | Bennett | G06F 12/0246 |
| | | | 711/103 |
| 2015/0062133 A1 | 3/2015 | Baxter et al. | |
| 2015/0207841 A1* | 7/2015 | Drang | H04N 21/23439 |
| | | | 709/219 |
| 2016/0209889 A1 | 7/2016 | Herman et al. | |
| 2016/0217104 A1 | 7/2016 | Kamble et al. | |
| 2017/0091981 A1 | 3/2017 | Herr et al. | |
| 2017/0180272 A1* | 6/2017 | Bernath | H04L 49/3054 |
| 2017/0277709 A1* | 9/2017 | Strauss | G06F 16/1727 |
| 2017/0286363 A1* | 10/2017 | Joshua | G06F 15/17331 |
| 2018/0181322 A1* | 6/2018 | Khan | G06F 3/0619 |

OTHER PUBLICATIONS

Fang, Chin, "Using NVMe Gen3 PCIe SSD Cards in High-density Servers for High-performance Big Data Transfer Over Multiple Network Channels", SLAC Technical Note, 2015 (Google Scholar) http://www.slac.stanford.edu/cgi-wrap/getdoc/slac-tn-15-001.pdf (17 pages).

Cho, Benjamin Y., et al., XSD: Accelerating MapReduce by Harnessing the GPU inside an SSD, (Google Scholar), http://www.cs.utah.edu/wondp/XSD_final.pdf (6 pages).

Zhang, Jie et al., "NVMMU: A Non-Volatile Memory Management Unit for Heterogeneous GPU-SSD Architectures", http://www.cs.utah.edu/wondp/XSD_final.pdf (12 pages).

\* cited by examiner

SYSTEM AND METHOD FOR SUPPORTING ENERGY AND TIME EFFICIENT CONTENT DISTRIBUTION AND DELIVERY

CROSS-REFERENCE TO RELATED APPLICATION(S)

The present application claims priority to, and the benefit of, U.S. Provisional Patent Application No. 62/517,821, filed on Jun. 9, 2017, the contents of which are incorporated herein by reference in its entirety.

BACKGROUND

1. Field

Some embodiments of the present disclosure relate generally to content distribution across content delivery networks.

2. Description of the Related Art

A content delivery network (CDN) is a globally distributed network of proxy servers that are deployed in multiple data centers to enable broad distribution of valuable content to end users. For example, such content may include audio data, video data, ad content, etc. Accordingly, CDNs serve a large fraction of Internet content, such as video, audio, software, etc. Content owners, or content distributors (e.g., media companies and vendors), pay CDN operators to deliver requested content to various end users. In return, the CDN generally pays internet service providers (ISPs), carriers, and network operators a fee for providing data centers to host the CDN servers.

CDN nodes may be deployed in multiple locations, and may be deployed over multiple network backbones. The benefits that the CDN nodes provide for content owners and content distributors include reduced bandwidth cost, faster page loading, and increased geographical availability of the distributed content.

The number of CDN nodes and servers making up a particular CDN may vary depending on the architecture of the CDN. Some CDNs may include thousands of nodes with tens of thousands of servers on many remote points of presence (PoPs). Other CDNs may form a global network while maintaining a relatively small number of geographical PoPs.

Algorithms associated with the CDN may determine through which nodes different content requests and content data will travel, and are typically optimized in some manner to achieve some desired goal. For example, optimization of the algorithms can consider performance, which may determine which location is best for serving the requested content to the end user. An optimization technique for delivery across local networks may include, for example, using locations with the fewest hops, using locations associated with the lowest latency/lowest network time from the requesting client, or using locations providing the highest server performance availability. Another optimization technique may factor in cost associated with the delivery of the content to the end user, where locations are chosen based on associated pricing instead of associated performance. However, cost and performance optimizations may align, as edge servers may be as close as possible to the end user at the edge of the CDN, thereby providing some advantage in cost, energy usage, and/or performance.

CDN providers typically offer services over a diverse set of defined PoPs that vary based on coverage levels. The sets of defined PoPs may include the US, an International/Global band, Asia Pacific, etc. These PoP sets are commonly referred to as edges, edge nodes, or edge networks, due to their proximity to the CDN asset edge for the end user.

CDN edge networks may grow via acquisitions. Acquisitions include purchasing, peering, and exchange of colocation facilities, bandwidths, and servers. Some companies may include CDN end points that deploy nodes belonging to the company to enable the company to implement measures deemed important to the company. For example, one implemented measure may include content protection on a variety of formats (e.g., both standard and HD versions of the same movie, both versions being protected by encryption).

The CDN end points may conventionally include one or more memory drives (e.g., solid state drives (SSDs) or hard drives in an array). The storage drives may deliver distributed content from storage using a server that is able to read from the storage. The CDN end point may reconstitute, encrypt, or otherwise manipulate the content data. That is, the content is distributed by being retrieved off disc/from storage and sent onto the CDN network. However, using standard servers and processors to perform these tasks may be expensive and energy consuming.

Furthermore, CDNs augment the end-to-end principle of the Internet transport network by distributing multiple intelligent applications with techniques designed for content delivery optimization. The applications may include web caching, server-load balancing, request routing, and content services.

With respect to the above applications, web caching is a method for storing popular content on servers having the greatest demand for the requested content. Web caching occurs on shared network appliances, reduces bandwidth requirements and server load, and improves client response times for content stored in cache.

Server-load balancing is another technique for sharing traffic between a number of servers or web caches, and may use specialized hardware, such as Layer 4-7 switches, web switches, content switches, or multiplayer switches. When traffic arrives at the switch, the traffic is redirected to a physical web server attached to the switch. Advantages include load balancing, increased total capacity, better scalability, and increased reliability due to redistribution of failed web server loads and performance of server health checks.

FIG. 1 depicts a related art nonvolatile memory express (NVMe)-based system used in a content distribution network.

Referring to FIG. 1, in a conventional CDN 100, different content is located in traditional storage (e.g., nonvolatile memory express solid state drives (NVMe SSDs)) 120. The movement of content through the SSD 120 to the end user/subscriber 170 is as follows.

First, a local CPU 110 will move content data related to the requested content from a selected SSD 120 via a midplane 125 and via an associated Peripheral Component Interconnect Express (PCIe) switch 130 to dynamic random access memory (DRAM) of the CPU 110. Then, the content data is moved to a graphics processing unit (GPU) within or associated with the CPU 110, and the GPU processes the content with an associated high bandwidth memory 140. The processed content is then moved back to the DRAM of the CPU 110 via direct memory access (DMA) operations. The processed content thereafter is moved again via a PCIe bus to the local network interface controller (NIC) 150, which will then transfer the processed contents to an end user 170 (i.e., the customer or subscriber).

However, moving data to the GPU or equivalent processor to process the data before sending the processed data to the end user 170 can be costly in terms of energy consumption. That is, a potential issue with a conventional CDN 100 is that there may be too many touch points through which the content must pass before the end user 170 can receive the content. Accordingly, there may be improved methods for delivering requested content to end users.

SUMMARY

Some embodiments of the present disclosure provide a system and method for enabling improved content distribution across content delivery networks.

According to some embodiments, there is provided a method of transferring data to an end user via a content distribution network using an nonvolatile memory express over fabrics (NVMe-oF) device, the method including receiving a read request at the NVMe-oF device, translating a logical address corresponding to the data to a physical address, fetching the data from a flash storage of the NVMe-oF device, processing the data with a GPU that is either embedded in the NVMe-oF device, or on a same chassis as the NVMe-oF device, and transferring the data.

Transferring the data may include transferring the data to the end user without transferring the data to a local CPU between the end user and the GPU.

The method may further include transferring data to a remote host corresponding to the end user, and sending a completion message to the remote host after transferring the data.

The method may further include identifying the processed data by the NVMe-oF device.

Identifying the processed data may include storing the data in a Namespace, and performing a set of data transformations when a data read operation happens to the Namespace.

Identifying the processed data may include identifying the processed data via a key-value type storage system.

Identifying the processed data may include assigning a logical block address (LBA) range with a set of data transformation instructions.

Processing the data may include formatting the data according to a request by the end user and corresponding to the read request.

The NVMe-oF device may include an eSSD.

According to some embodiments, there is provided an NVMe-oF chassis including a graphics processing unit (GPU), and a plurality of NVMe-oF devices for transferring data to an end user via a content distribution network, each of the NVMe-oF devices including a memory for storing the data, and a network fabric interface.

The network fabric interface may be an Ethernet interface, InfiniBand CAPI, or FibreChannel.

The GPU may include a U.2 form-factor GPU.

The NVMe-oF chassis may further include an Ethernet switch or PCIe switch, wherein the plurality of NVMe-oF devices are configured to establish a private communication channel with the GPU via the Ethernet switch or the PCIe switch.

The NVMe-oF chassis may further include a BMC device in the NVMe-oF chassis, wherein a location address of the GPU is programmed in a corresponding one of the NVMe-oF devices by the BMC device.

The GPU may be configured to directly transfer requested data to an end user via a content distribution network.

According to some embodiments, there is provided an NVMe-oF device for transferring data to an end user via a content distribution network, the NVMe-oF device including a memory for storing the data, a network fabric interface, and an integrated a graphics processing unit (GPU) and an integrated Digital Signal Processor (DSP) for processing the data prior to transferring the data.

The network fabric interface may be an Ethernet interface, InfiniBand CAPI, or FibreChannel.

The NVMe-oF device may include an Ethernet solid state drive (eSSD).

The data may correspond to video data, and processing the data may include formatting the data according to a video format.

The GPU may be configured to directly transfer requested data to an end user via the network.

Accordingly, the described embodiments provide time efficient and energy efficient delivery and distribution of digital contents at points of presence (PoPs) while avoiding repeated copying of the same digital contents by CPUs and their memories. The described embodiments may also provide cost and power efficiency due to usage of U.2-GPU in a same nonvolatile memory express over fabrics (NVMe-oF) chassis, which avoids any need for conducting transcoder functions closer to the PoPs (e.g., 25 watts in SSD format as compared to 75 watts or higher for PCIe card form factor format).

BRIEF DESCRIPTION OF THE DRAWINGS

Some embodiments can be understood in more detail from the following description taken in conjunction with the accompanying drawings, in which.

DETAILED DESCRIPTION

Figure 1:
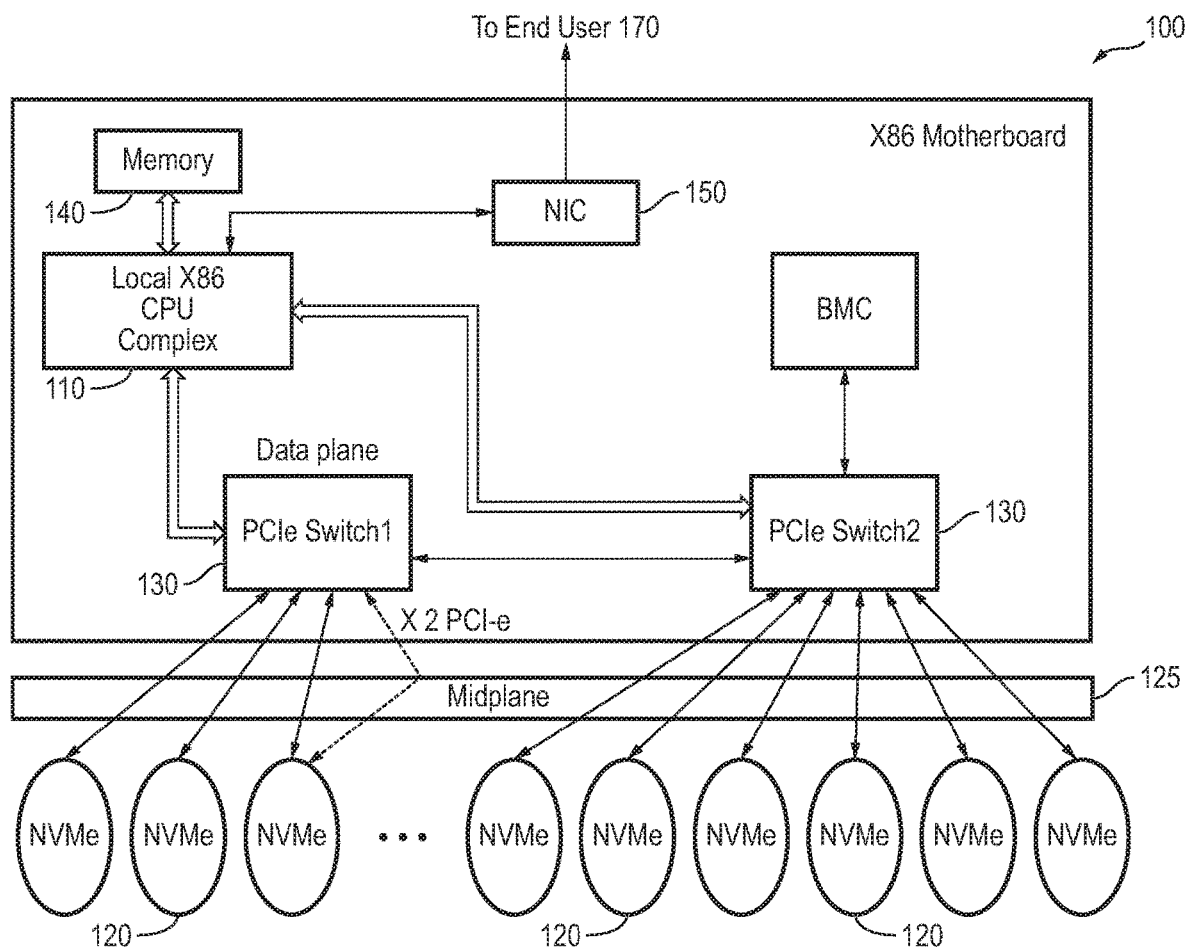
FIG. 1 depicts a related art NVMe-based system used in a content distribution network.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques which are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As discussed above, content providers may generate various types of content data to be delivered to end users according to usage-based or subscription-based paid services. The content providers may store the content data in storage nodes of a content distribution network (CDN), and the storage nodes may deliver the content data to end users through Point of Presence (PoP) servers when the end users request access to purchased media/content data through the PoP servers.

However, the requested content data stored in a memory drive array (e.g., an SSD array) may be transformed (e.g., encrypted/decrypted, compressed, or formatted) before it is used by the end users. Such data transformation may use large amounts of computing resources and data movements, and may thus add to the overall cost or latency of the CDN.

According to an embodiment of the present disclosure, a nonvolatile memory express over fabrics (NVMe-oF) device (e.g., an Ethernet solid state drive (eSSD)) can be used for content data storage (e.g., media storage). The eSSD may allow requested content data to be processed or transformed "on the fly" without resorting to the use of local CPU resources. Accordingly, when an end user requests delivery of the content data, the eSSD may perform transcoding or transformation prior to transferring the content data to the CDN to be accessed by the end user.

Accordingly, embodiments of the present disclosure may provide benefit over conventional CDNs by performing media transcoding using an eSSD embedded with a specialized graphics processor/graphics processing unit (GPU) for processing the content data as part of content delivery. Other embodiments of the present disclosure may provide benefit over conventional CDNs by using a U.2-GPU to perform media transcoding in the Ethernet SSD chassis. That is, below are discussed two embodiments to enable the eSSD to process content data that is to be delivered: an eSSD-embedded GPU; and a U.2-GPU external to the eSSD but located in the same chassis.

It should be noted that, although the drives referenced with respect to the described embodiments are indicated as eSSDs (i.e., Ethernet connected SSDs), connection to the eSSDs of the described embodiments may be accomplished by an addressable network fabric other than Ethernet. That is, embodiments of the present invention may use any fabric that provides discoverability, addressability and sufficient function to perform the functions described. Other fabrics might include InfiniBand CAPI, perhaps even FibreChannel. Further, the eSSDs may be interfaced using internet protocol or any other network-layer protocol that provides network addressability. Additionally, the drives need not be SSDs, but may alternatively be some other form memory that is able to communicate via NVMe-oF protocol, according to other embodiments of the present disclosure. It should be further noted that the described embodiments can be applied to various form factors, such as U.2 SFF, M.2, and new drive form factors.

Figure 2:
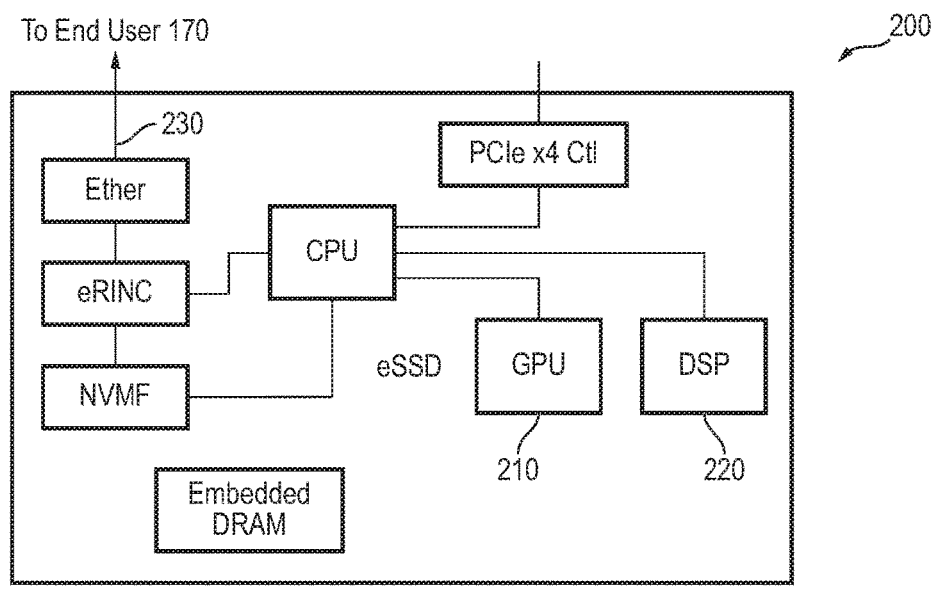
FIG. 2 depicts an Ethernet SSD (eSSD) including a graphics processing unit (GPU) and a digital signal processor (DSP), according to an embodiment of the present disclosure.
Figure 3:
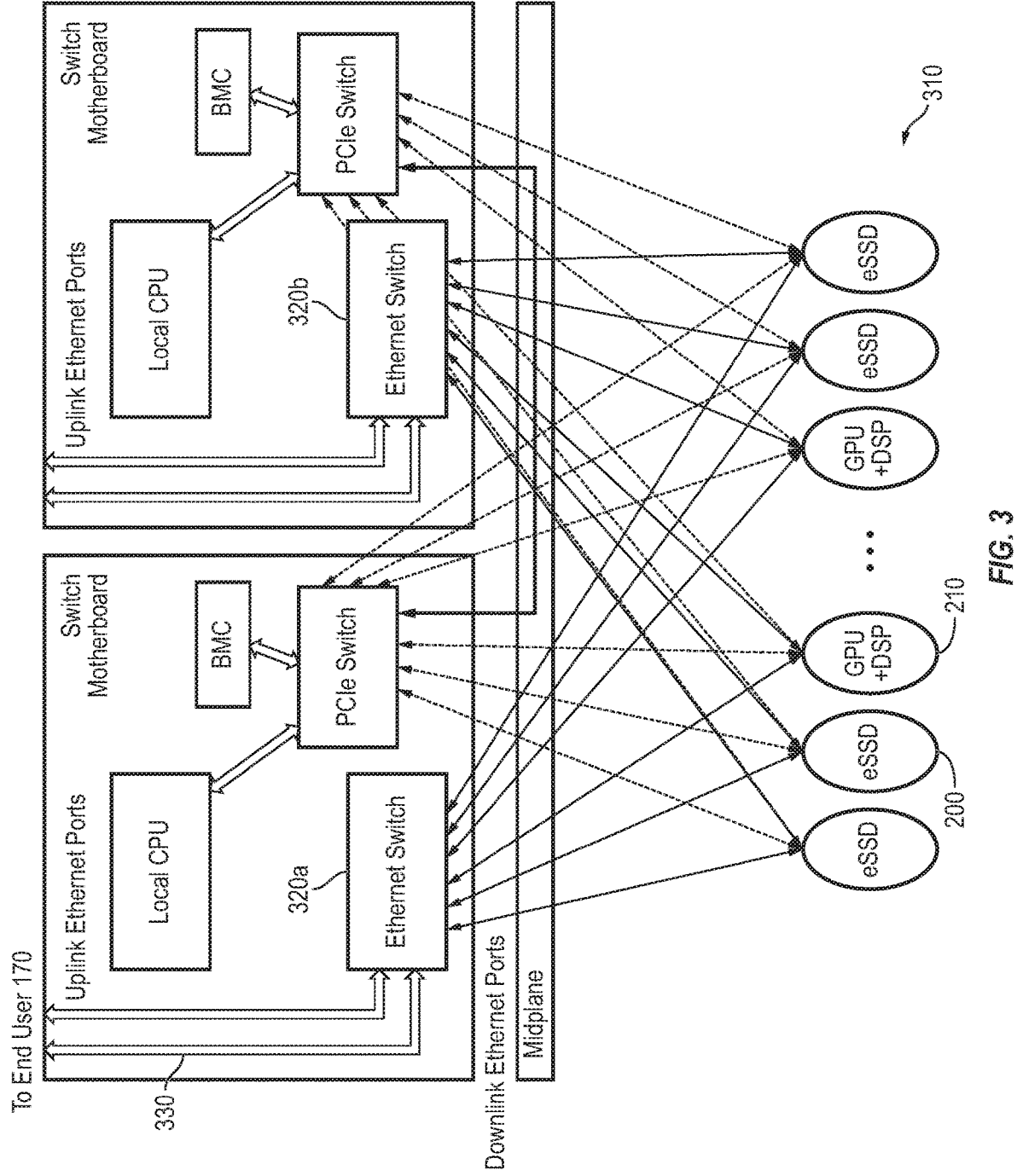
FIG. 3 depicts an NVMe-oF-based system including a GPU and DSP in SSD form factor as part of a content distribution network (CDN), according to an embodiment of the present disclosure.

FIG. 2 depicts an eSSD including a GPU and a DSP, according to an embodiment of the present disclosure. FIG. 3 depicts an NVMe-oF-based system including a GPU and DSP in SSD form factor as part of a CDN.

Referring to FIGS. 2 and 3, a special purpose eSSD 200 of an embodiment of the present disclosure may include an embedded GPU 210 and a DSP 220 (e.g., a GPU with DSP in SSD form factor). In another embodiment, an eSSD may include a field-programmable gate array (FPGA) for accomplishing tasks that may be completed by the GPU 210 and the DSP 220 of the eSSD 200 of the present embodiment. Furthermore, the GPU 210 and the DSP 220 may be located in a single device.

The eSSD 200 may be used in an NVMe-oF-based system (e.g., see FIG. 3) for providing a cost-effective and energy-efficient method for distribution of content data to PoP devices/servers in a CDN. Accordingly, a plurality of eSSDs may include GPUs, FPGAs, and/or DSPs to be used in a CDN edge array 310 to serve as localized caches for high demand (e.g., frequently accessed) content data.

The GPU 210 (along with the DSP) may be put into an SSD form factor, and may be plugged into the CDN edge array 310, and may thereby be discovered by other eSSDs 200 of the array 310. Furthermore, to accomplish the described embodiments, the GPU 210 may be a GPU compute device with incorporated flash (e.g., flash embedded on a GPU card).

The eSSDs 200 may decrypt and process content data for delivery to a remote consumer/an end user 170, thereby obviating complex, high-end edge servers including large centralized computer resources for the distribution of the content data, and thereby reducing the amount of data movements (and associated energy costs) needed for delivering the content data to the end user 170.

When the end user 170 requests media/content data, the eSSD 200 receives one or more read commands from a remote host/CPU that has received a corresponding request from the end user 170. The requested content data may be read from flash media of the eSSD 200, and may be initially processed by the embedded GPU 210. The processed content data is then transferred to the end user 170 directly via Ethernet connectivity. For example, the data may be transferred to the end user 170 via SAS pins S2, S3, S5, and S6 as a primary Ethernet port 230 of the eSSD 200, or via SAS pins S9, S10, S12, and S13 as a secondary Ethernet port 230, via an Ethernet switch 320 (e.g., a primary Ethernet switch 320a corresponding to the primary Ethernet port 230, or a secondary Ethernet switch 320b corresponding to the secondary Ethernet port 230), and via an Ethernet connection 330 that is connected to the end user 170.

The processed media/content data can be identified by the eSSD 200 using various methods. According to one embodiment, the content data may be stored in specific Namespaces, such that when a data read operation happens to that Namespace, a set of data transformations are performed. According to another embodiment, the remote host corresponding to the end user 170 may assign certain logical block address (LBA) ranges with the set of data transformation instructions. According to yet another embodiment, the data may be identified via a key-value type storage system.

Figure 4:
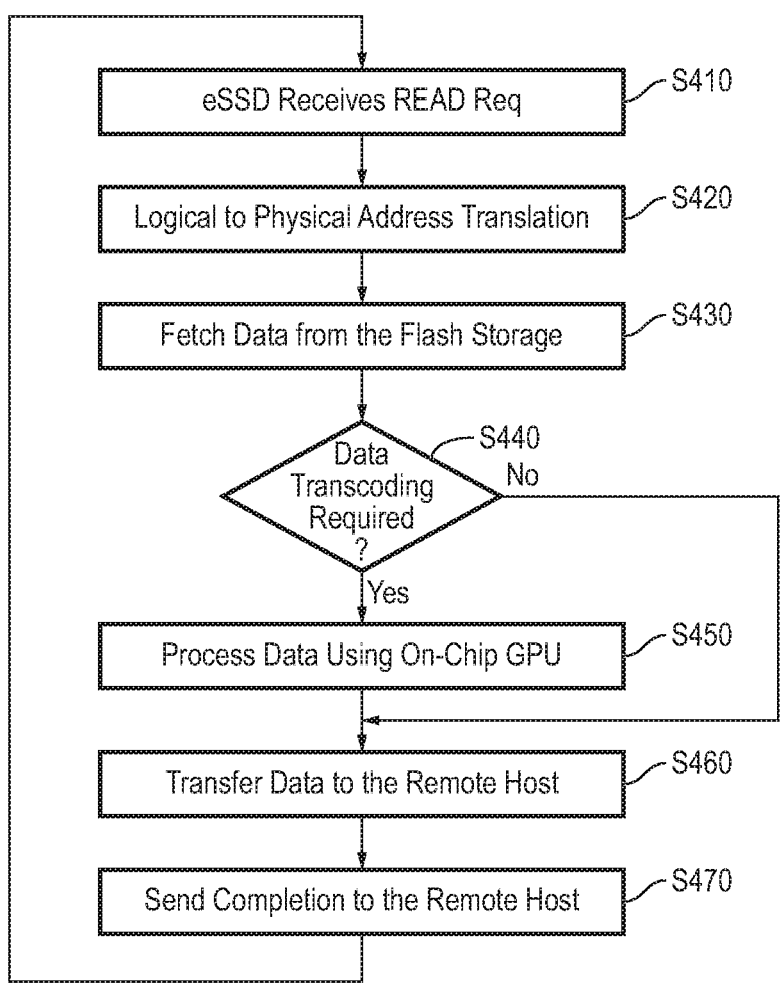
FIG. 4 is a flowchart depicting a method of transcoding content data prior to delivery to an end user using an eSSD embedded with a GPU, according to an embodiment of the present disclosure.

FIG. 4 is a flowchart depicting a method of transcoding content data prior to delivery to an end user using an eSSD embedded with a GPU, according to an embodiment of the present disclosure.

Referring to FIG. 4, a remote end user 170 may send a request for requesting content data, and the eSSD 200 may receive a corresponding read request (e.g., from a remote host) corresponding to the end users request (S410). The eSSD 200 may then perform a logical-to-physical address translation (S420) based on the read request. The eSSD 200 may then fetch the requested content data from flash storage, which may be within the eSSD 200 (S430). The eSSD 200 may then determine whether data transcoding on the fetched content data is to be performed before sending the data to the end user 170 (S440).

If the eSSD 200 determines that data transcoding is to be performed on the fetched content data, the eSSD 200 may process the data using an on-chip GPU 210/a combined GPU/DSP unit, which may process the data on the fly (S450). If no data transcoding is to be performed, or after the on-chip GPU 210 of the eSSD 200 transcodes/processes the data, the eSSD 200 transfers the processed data to the remote host corresponding to the end user 170 (S460). Once the content data is placed onto the CDN by the eSSD 200, the eSSD 200 sends a completion message to the remote host corresponding to the end user 170 to indicate that the data has been transferred to the CDN (S470).

Figure 5:
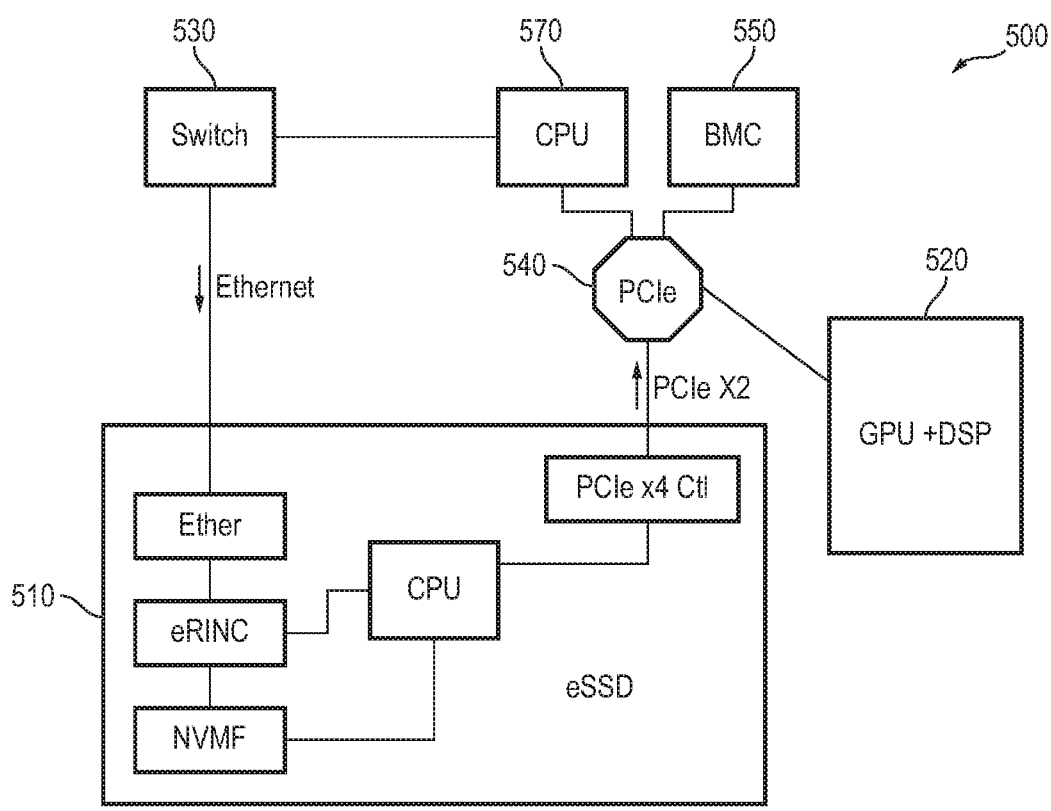
FIG. 5 depicts a system architecture for media transcoding using an external U.2-GPU in an NVMe-oF device chassis, according to an embodiment of the present disclosure.
Figure 6:
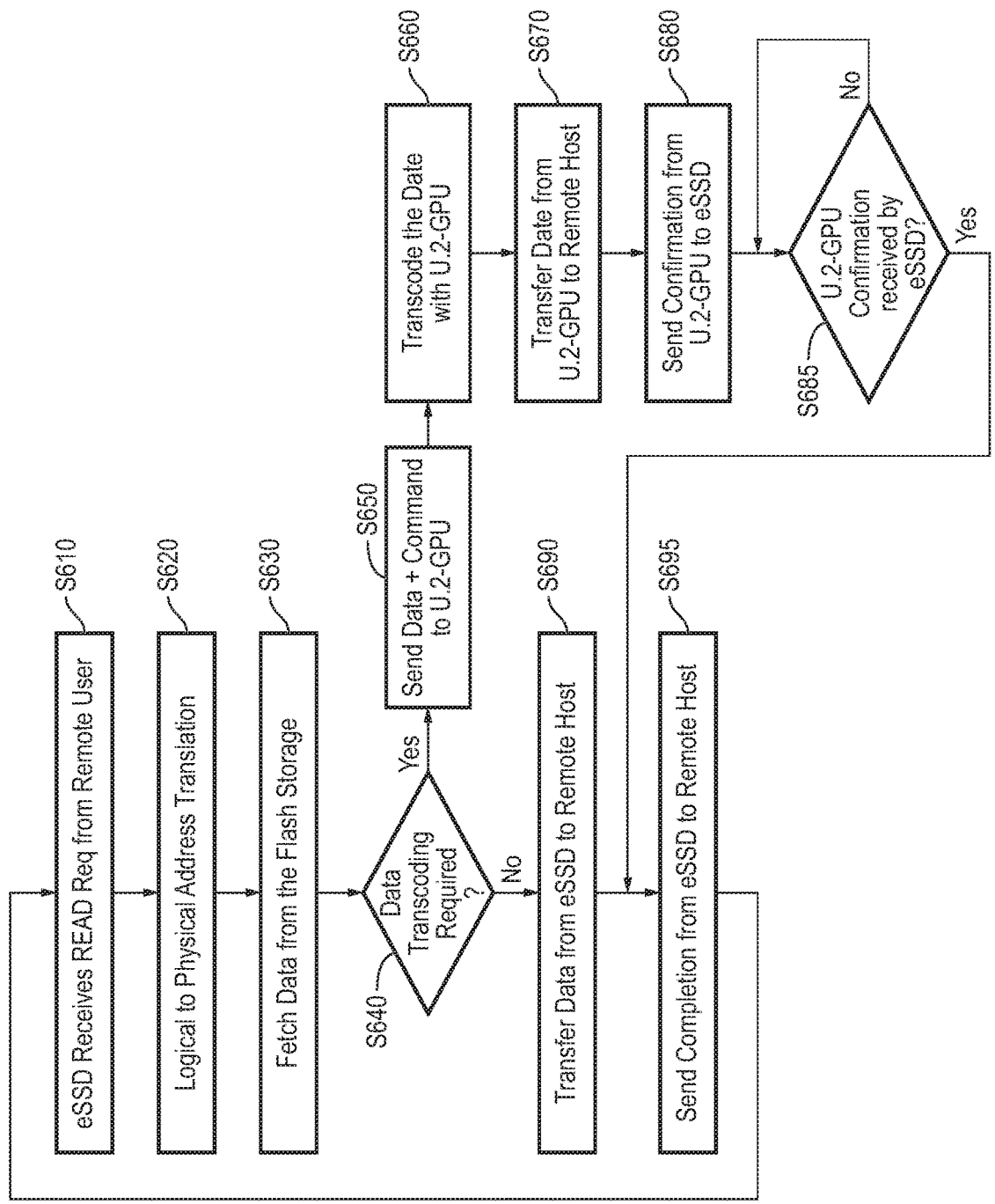
FIG. 6 is a flowchart depicting a method of operating an eSSD using a U.2-GPU to perform media transcoding, according to an embodiment of the present disclosure.

FIG. 5 depicts a system architecture for media transcoding using an external U.2-GPU in an NVMe-oF device chassis, according to an embodiment of the present disclosure. FIG. 6 is a flowchart depicting a method of operating an eSSD using a U.2-GPU to perform media transcoding, according to an embodiment of the present disclosure.

Referring to FIGS. 5 and 6, an eSSD 510 of the present embodiment uses a U.2-GPU 520 present in a chassis 500 (e.g., an eSSD chassis) shared by one or more memory drives (e.g., eSSDs). The GPU 520 may be resourced according to constraints of CDN requirements and environmental limitations. The U.2-GPU 520 may be a combined GPU/DSP unit. The chassis 500 may contain one or more U.2 form-factor GPUs 520, which have large compute resources.

In the present embodiment, an eSSD 510 on the chassis 500 may establish a private communication channel with the U.2-GPU 520 on the chassis 500 using an Ethernet switch 530 or a PCIe switch 540. A location address of the U.2-GPU 520 may be programmed in the eSSD 510 by a board management controller (BMC) 550 present in the chassis 500.

Referring to FIG. 6, the eSSD 510 may receive a host read request (e.g., the eSSD 510 may receive a read request from a remote host corresponding to a content data request by an end user 170) (S610). The eSSD 510 may then perform a logical-to-physical address translation to locate the content data (S620), and may fetch the content data from the flash storage, which may be in-band data that is sent to the eSSD 510 over NVMe-oF fabrics (S630). The eSSD 510 may then determine whether data transcoding or data processing is to be performed (S640).

If the eSSD 510 determines that data transcoding or processing is to be performed, the eSSD 510 sends the data to the U.2-GPU 520 directly for further processing, and also sends sufficient information (S650) to thereby enable the U.2-GPU 520 to directly transfer the ultimately processed data to the end user 170 through the U.2's Ethernet connectivity (S670). The target eSSD 510 may forward the in-band data to the local U.2-GPU 520, which may be owned by, or assigned to, the requesting eSSD 510 (otherwise, the eSSD 510 may arbitrate for the shared resources through the local CPU 570 or the BMC 550). The copy of the data to be processed may be forwarded to the GPU 520 via PCIe lanes including the PCIe switch 540.

Thereafter, the U.2-GPU 520 may transcode the content data (S660), and may transfer the transcoded data directly to the end user 170 (S670). When the data is transferred successfully, the U.2-GPU 520 may send a status message or confirmation message to the eSSD 510 using a private communication channel between the eSSD 510 and the U.2-GPU 520 (S680). The requesting eSSD 510 may then wait for such confirmation from the U.2-GPU 520 (S685) before sending the command completion to the remote host corresponding to the end user 170 (S695). The U.2-GPU 520 may send the processed data back to the eSSD 510, and the eSSD 510 may transfer the data to the remote host corresponding to the end user 170 (S690). However, the U.2-GPU 520 may more efficiently perform the direct data transfer to the remote host corresponding to the end user 170 (S670).

If the eSSD 510 determines that data transcoding is not needed (S640), then the eSSD 510 may transfer the data to the remote host corresponding to the end user 170 (S690), and after transferring all of the content data to the CDN, the eSSD 510 may send a command completion to the remote host corresponding to the end user 170 (S695) and await another read request.

In some embodiments, higher level software (e.g., object store software) can be used to track the locations and identities of data. Accordingly, the eSSD 510 drive can optionally independently create and store transcoded data as a separate entity, thus enabling the device to be content aware.

According to the above, an NVMe-oF-based chassis 500 may be deployed as one or more CDN nodes for different requested content data. Upon receiving a request from multiple end users for specific content data (e.g., movies in different formats), it may be determined that the requested contents may be located on the node (i.e., on the NVMe-oF-based chassis 500). The target eSSD 510 may send an internal request to an available combined GPU/DSP unit 520 to transform "raw data" of the requested content (e.g., the requested movie) into the format requested by a particular end user 170. After transformation of the raw content data is complete, the GPU/DSP unit 520 may forward the movie directly to the end user 170 without transferring the data corresponding to the movie back to the original target eSSD 510.

Unlike conventional systems, the described embodiments do not need a local CPU to move the requested contents from a selected SSD via a PCIe switch to the CPU's DRAM. Moreover, the computing resources in the described embodiments rely on compute resources within the eSSD 510 and/or the U.2 GPU 520 (out-of-band manageability notwithstanding). The described embodiments also do not need processed content data to move back to the CPU's DRAM via DMA operations, and do not need the processed content data to be moved again via a PCIe bus to the local NIC. Accordingly, because fewer instances of data movement are used (when compared conventional CDNs), network latency and energy consumption may be reduced (e.g., reduced by up to a factor of 1,000) due to less movement of data between eSSD and GPU units, while providing the same requested digital contents to the end users.

Accordingly, embodiments of the present disclosure provide an eSSD (or other NVMe over a fabric interface on the Ethernet) system including a plurality of ESSDs coupled to a switch, and either a central resource or an ESSD resource including a dedicated computation resource to do at rest encryption during transit functions of requested content data directly on/next to the eSSD. The dedicated computation resource is then able to directly ship content data out to the fabric to avoid further I/O operations. Furthermore, there may be resources employed, which otherwise might be idle within the SSD, and the cost of the computation for connecting to the network and performing authentication may be avoided.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of transferring data to a user device via a content distribution network using a nonvolatile memory express over fabrics (NVMe-oF) device, the method comprising: receiving a read request at the NVMe-oF device that is serving as part of a localized cache in an edge array of the content distribution network, the read request corresponding to a request from the user device; generating a physical address based on a logical address, the logical address corresponding to the data; receiving the data from a Hash storage of the NVMe-oF device; in response to the read request, processing the data with a graphics processing unit (GPU) that is embedded in the NVMe-oF device or that is on a same chassis as the NVMe-oF device by media transcoding with the GPU for processing the data as part of content delivery; and transferring; by the NVMe-oF device; the data to the user device via a network fabric interface in response to the read request.

2. The method of claim 1, wherein transferring the data comprises transferring the data to the user device while bypassing any central processing unit (CPU) between the user device and the CPU.

3. The method of claim 1, further comprising: transferring the data to a host corresponding to the user device; and sending a completion message to the host.

4. The method of dam 1, further comprising: storing the data using a namespace; performing a data read operation to the namespace; and performing a set of transformations to the data.

5. The method of claim 1, wherein the processed data comprises key-value data.

6. The method of claim 1, further comprising, locating a logical block address (LBA) range representing a et of transformation instructions for transforming the data.

7. The method of claim 1, wherein processing the data comprises formatting the data corresponding to the read request according to the request by the user device.

8. The method of dam 1, wherein the NVMe-oF device comprises an Ethernet solid state drive (eSSD).

* * * * *